US012077388B2

(12) United States Patent
Büchi

(10) Patent No.: US 12,077,388 B2
(45) Date of Patent: Sep. 3, 2024

(54) VIBRATING TABLE AND FEEDER WITH VIBRATING TABLE

(71) Applicant: FLEXFACTORY AG, Dietikon (CH)

(72) Inventor: Felix Büchi, Dänikon (CH)

(73) Assignee: FLEXFACTORY AG, Dietikon (CH)

( * ) Notice: Subject to any disclaimer, the term of this patent is extended or adjusted under 35 U.S.C. 154(b) by 0 days.

(21) Appl. No.: 17/766,170

(22) PCT Filed: Sep. 25, 2020

(86) PCT No.: PCT/EP2020/076990
§ 371 (c)(1),
(2) Date: May 24, 2022

(87) PCT Pub. No.: WO2021/063843
PCT Pub. Date: Apr. 8, 2021

(65) Prior Publication Data
US 2024/0051763 A1    Feb. 15, 2024

(30) Foreign Application Priority Data
Oct. 2, 2019 (EP) .................................. 19201155

(51) Int. Cl.
*B65G 27/18*  (2006.01)
*B65G 27/04*  (2006.01)
(Continued)

(52) U.S. Cl.
CPC ............. *B65G 27/18* (2013.01); *B65G 27/04* (2013.01); *B65G 47/26* (2013.01); *B25J 9/0093* (2013.01)

(58) Field of Classification Search
CPC ........ B65G 27/04; B65G 27/08; B65G 27/12; B65G 27/18; B65G 27/32; B65G 27/34; B65G 47/26; B25J 9/0093
See application file for complete search history.

(56) References Cited

U.S. PATENT DOCUMENTS

| 5,404,996 A * | 4/1995 | Durnil .................. B65G 27/32 |
| | | 198/761 |
| 5,602,433 A * | 2/1997 | Brence .................. B65G 27/08 |
| | | 310/15 |

(Continued)

FOREIGN PATENT DOCUMENTS

| EP | 2393739 B1 | 12/2012 |
| JP | 59-92813 A | 5/1984 |

(Continued)

OTHER PUBLICATIONS

Singapore Office Action for Singapore Application No. 11202204687V, dated Sep. 27, 2023.

(Continued)

*Primary Examiner* — Gene O Crawford
*Assistant Examiner* — Keith R Campbell
(74) *Attorney, Agent, or Firm* — Birch, Stewart, Kolasch & Birch, LLP

(57) ABSTRACT

The invention relates to a vibration table (1) comprising a table plate (2) and a drive (3), wherein the drive (3) comprises four scissor mechanisms (41, 42, 43, 44), each having a first (41.1, 42.1, 43.1, 44.1) and a second limb (41.2, 42.2, 43.2 and 44.2) and a hub (41.3, 42.3, 43.3, 44.3), wherein the hubs (41.3, 42.3, 43.3, 44.3) are fastened to the table plate (2) and the first limb (41.1, 42.1, 43.1, 44.1) can be moved independently of the second limb (41.2, 42.2, 43.2, 44.2).

20 Claims, 3 Drawing Sheets

(51) Int. Cl.
*B65G 47/26* (2006.01)
*B25J 9/00* (2006.01)

(56) References Cited

U.S. PATENT DOCUMENTS

| | | | | |
|---|---|---|---|---|
| 5,615,763 A | * | 4/1997 | Schieber | B65G 27/32 |
| | | | | 198/770 |
| 5,816,386 A | | 10/1998 | Carlyle | |
| 5,853,082 A | * | 12/1998 | Buckley | B65G 27/20 |
| | | | | 198/752.1 |
| 6,276,518 B1 | * | 8/2001 | Wierman | B65G 27/32 |
| | | | | 198/752.1 |
| 7,028,829 B2 | * | 4/2006 | Buchi | B65G 27/32 |
| | | | | 198/444 |
| 8,550,233 B2 | * | 10/2013 | Perroud | B65G 27/34 |
| | | | | 198/760 |

FOREIGN PATENT DOCUMENTS

| | | |
|---|---|---|
| JP | 1-303218 A | 12/1989 |
| JP | H01303218 A * | 12/1989 |
| JP | 11-165846 A | 6/1999 |
| JP | 2012-229118 A | 11/2012 |
| WO | WO 96/15055 A1 | 5/1996 |
| WO | WO 03/104116 A1 | 12/2003 |

OTHER PUBLICATIONS

Flexfactory ag., "Flexfactory anyfeed promotion video 2019", Youtube, Oct. 11, 2017 (Oct. 11, 2017), p. 1 pp., Retrieved from the Internet: https://www.youtube.com/watch?v=GxOY1Xy7VeA [retrieved on Mar. 25, 2020], XP054980325.

* cited by examiner

VIBRATING TABLE AND FEEDER WITH VIBRATING TABLE

TECHNICAL FIELD

The invention relates to a vibrating table and to a feeder with a vibrating table according to the invention. In addition, the invention relates to various methods for operating and setting up a vibrating table according to the invention and a feeder according to the invention.

Feeders serve to separate parts of a bulk material so that they can be grasped individually by a robot arm or by other means, and transported onward. It is often a question of small parts having comparatively complicated geometry, such as screw terminals, lamp sockets, interdental brushes, needles, push-buttons, springs, cannulas, high-current contacts, gearwheels, covers, toy parts, electrical chokes and similar.

STATE OF THE ART

From the state of the art it is known to equip such feeders with a vibrating table. The bulk material is charged in small portions onto the vibrating table and is separated by vibrations. By virtue of stronger vibrations, the parts of the bulk material can also be turned over in some cases.

Such a feeder is described in EP 2 393 739 B1 (Asyril), for instance. This document teaches to generate the vibration by three mutually perpendicular piezoelectric, electromechanical, pneumatic or hydraulic drives which act on the tabletop independently of one another. The drives each consist of two parts, which move toward one another, and a guide.

The disadvantage of this drive technology consists in the fact that the vibrations arising depend on the load on the table. The depth of penetration of one part of the drive into the other part increases in the vertical direction, at least in the case of electromechanical and pneumatic drives, with increasing loading of the table. Either the loading has to be specified really precisely, or the drive has to be designed to be comparatively strong. A piezoelectric drive is very restricted in its amplitude. In addition, hydraulic and pneumatic drives are technically elaborate, as they have to be configured to be liquid-tight or gas-tight. EP '739 does not consider how this might be possible in the case of a comparatively small feeder and three drives that are capable of being operated independently of one another.

STATEMENT OF THE INVENTION

The object of the invention is to create a vibrating table, pertaining to the technical field mentioned in the introduction, that executes vibrations that are constant in amplitude and frequency, irrespective of its loading, and that enables both a spreading of bulk material and a targeted transport and turning over of parts of the bulk material.

The solution achieving this object is defined by the features of claim 1. According to the invention, the vibrating table comprises a tabletop and a drive. The drive comprises four scissor mechanisms. Each scissor mechanism has a first and a second shank and a nodal point. The nodal points are attached to the tabletop. The first shank can be moved independently of the second shank.

Accordingly, there is always a mechanical connection here between the fixed base, which bears the scissor mechanisms, and the vibrating table, vibrating with respect to the base. The motion is consequently guided and controlled at all times.

The transmission of the vibrations to different points on the tabletop permits a state to be generated in which, on average over time, the tabletop slopes down toward precisely one side, resulting, together with the vibration, in a movement of the parts in this direction.

In addition, a movement of an individual shank of a scissor mechanism results in a vibration having both a vertical and a horizontal component. This horizontal component can also be transmitted to parts on the vibrating table and utilized in this way for a targeted horizontal motion.

Finally, the amplitude of the vibration arising can be varied by skillful driving of the two shanks and can consequently be optimally adapted to the existing situation.

In their initial position, the shanks preferably enclose an angle of about 90°.

In this embodiment, the magnitudes of the vertical and horizontal components of the motion of a shank are approximately equal if the eccentricity is small. It has been shown that the parts can be transported swiftly and purposefully with this geometry.

In one embodiment, each shank is rotatably attached to an eccentric disk. The shank can be moved by rotation of the eccentric disk.

The shank exhibits a circular hole which can accommodate the eccentric disk. The center of this hole will be designated in the following as the midpoint of the shank. The point of attachment is the place on the shank that is situated at the nodal point of the scissor mechanism. The connecting line between the midpoint of the shank and the point of attachment will be designated in the following as the shank segment. The length of the shank is the length of the shank segment.

The eccentric disk is a circular disk that can be accommodated by the hole in the shank. Said disk has a midpoint and a point of penetration of the axis of rotation. The point of penetration of the axis of rotation will be designated in the following as the axis of rotation itself. The distance between the axis of rotation and the midpoint of the eccentric disk is the eccentricity; it has the variable $e$. When driven, the eccentric disk rotates about the axis of rotation.

One revolution of the eccentric disk will also be designated in the following as a drive cycle. The position of the axis of rotation with respect to the shank segment defines a certain drive position. Of particular importance is the initial position, which is the drive position in which the axis of rotation is situated on this shank segment. Another special drive position is the maximum position, in which the axis of rotation is situated on the extension of the shank segment. A temporally continuous part of the drive cycle is designated as a drive phase.

Now, by virtue of the eccentricity, the spacing between the axis of rotation, fixed with respect to the base, and the nodal point, fixed with respect to the vibrating table, varies. The spacing between the axis of rotation and the nodal point will be designated in the following as the effective length of a shank.

The effective length is equal to the shank length minus the eccentricity when the shank of the scissor mechanism in question is in the initial position. This is the smallest effective length occurring during a drive cycle. This length will therefore also be designated in the following as the minimum effective length, and has the variable $a$.

The effective length is equal to the shank length plus the eccentricity when the shank of the scissor mechanism in question is in the maximum position. This is the largest effective length occurring during a drive cycle.

When both shanks of a scissor mechanism are in the initial position, the two axes of rotation and the nodal point form an isosceles triangle. The two equally long sides of this triangle have the minimum effective length. Half the aperture angle of the equally long sides, a, characterizes the scissor mechanism together with the shank length and the eccentricity.

These two extreme values are passed through in the course of one revolution of the eccentric disk. The effective length accordingly changes by twice the eccentricity during a drive cycle.

If both shanks of a scissor mechanism are brought synchronously from the initial position into the maximum position, the nodal point rises. This is the largest amplitude that can be obtained with the drive according to the invention. In the following, this amplitude will be designated as the maximum amplitude. The synchronous driving of both shanks of a scissor mechanism will be designated in the following as dual driving.

If only one of the shanks of a scissor mechanism is brought from the initial position into the maximum position, while the other shank remains in the initial position, the nodal point likewise rises, but less. The amplitude of this oscillation will be designated in the following as the mean amplitude. The driving of only one shank of a scissor mechanism, while the other shank remains in the initial position, will be designated in the following as single driving.

In the case of very large eccentricity and single driving, it may happen that the greatest height of the nodal point is attained before half a drive cycle has been completed. This is the case if $$\left(\frac{e}{a}\right)\left(1+\frac{e}{a}\right) > \sin(\alpha)^2,$$

where e is the eccentricity, a is the shank length minus the eccentricity, and α is half the aperture angle between the shanks in the initial position. In this case, one complete drive cycle comprises four drive phases. Starting from the initial position, the nodal point firstly goes up in a first horizontal direction. The mean amplitude has then been attained. The first drive phase now passes over into the second drive phase, in which the nodal point falls while it continues to migrate in the first horizontal direction. Starting from the maximum position, the third drive phase begins, in which the horizontal direction of motion rotates and goes in a second horizontal direction, while the nodal point ascends again in the vertical direction as far as the height of the mean amplitude. Here the fourth drive phase begins. In this phase, the nodal point falls and moves further in the second horizontal direction. The mean amplitude can accordingly be attained twice per drive cycle.

The eccentricity is preferably chosen within the range of $$\left(\frac{e}{a}\right)\left(1+\frac{e}{a}\right) \leq \sin(\alpha)^2,$$

since the drives can preferably be actuated individually and consequently the described frequency-doubling can also be realized in the case of smaller eccentricity by faster driving.

Besides single driving and dual driving, a plurality of further drive options are capable of being realized. For example, a plurality of further oscillations can be generated by a synchronous but phase-shifted drive of both shanks of a scissor mechanism or by an asynchronous drive, in which one shank is driven faster than the other. In the case of a synchronous, phase-shifted drive, both eccentric disks rotate at the same frequency, but their motion begins at different drive positions. In this way, a doubling of the oscillation frequency, in comparison with the drive frequency at a reduced amplitude in the vertical direction and an increased deflection in the horizontal direction, can be obtained by a phase shift of 180°.

In one embodiment of the vibrating table, the nodal points are arranged in a front row and in a back row. The front and back rows run parallel to one another. The scissor mechanisms are oriented so as to be perpendicular to these rows. The two nodal points that are situated in the front row are attached to a linear guide on the tabletop. The two nodal points that are situated in the back row are firmly attached to the tabletop.

The scissor mechanism permits the shanks to move in one plane or in two planes parallel to one another. These planes should define the orientation of the scissor mechanism. Scissor mechanisms are accordingly oriented so as to be precisely perpendicular to a row when the straight line that runs through the nodal points of this row penetrates the plane or planes of the scissor mechanism perpendicularly.

A linear guide permits the nodal point of the front row to move to a certain extent parallel to the tabletop in the plane of the scissor mechanism concerned. Consequently the spacing between the nodal points in the front row and the nodal points in the back row is variable within a certain scope.

This permits the scissor mechanisms of the front row to be operated independently of the scissor mechanisms of the back row.

The minimally necessary extent of the linear guide preferably results from the determination of the spacing between the nodal points in the case where all the shanks of the scissor mechanisms of the front row are in the maximum position and all the shanks of the scissor mechanisms of the back row are in the initial position and, conversely, from the determination of the spacing between the nodal points in the case where shanks of all the scissor mechanisms are in the initial position and in the case where the respectively outer shanks are in the initial position and the respectively inner shanks are in the maximum position.

The outer shanks are the shanks that are situated substantially outside the rectangle defined by the nodal points, and the inner shanks are the shanks that are situated substantially on the boundary lines or within the rectangle.

In the case where there are more than two rows of nodal points, the nodal points of the back row are preferably firmly attached to the tabletop, whereas all the other nodal points are guided in linear guides. Such further nodal points are preferably also arranged in rows which are parallel to the other rows and in which at least two nodal points are located in each instance.

In the case of more than two rows of nodal points, in the back row the same shanks are preferably regarded as inner or outer as in the case of the back row of two rows. In all the other rows, the shanks are classified as inner or outer shanks in a manner such as would be the case if there were only two rows, namely the row in question and the back row.

The linear guide described above may also be replaced, entirely or partially, by a virtual linear guide in which the drives of the front and rear scissor mechanisms are matched to one another in such a manner that the spacings between the nodal points remain substantially constant. Besides a targeted drive of all the scissor mechanisms, this can also be obtained by non-driven scissor mechanisms not being braked but being able to move along freely.

In one embodiment, four electronically synchronized motors drive the shanks. It is preferably a question of servomotors. Each motor preferably sets the eccentric disks of, in each instance, two shanks in rotation. In particular, the jointly driven shanks are two opposing shanks.

In another embodiment, one motor drives all the shanks, and for this purpose this motor utilizes a mechanism which, if need be, permits certain groups of shanks not to be driven.

While the utilization of a single motor has the advantage that only one such motor is needed and fewer calibrations are necessary, since a synchronization of the shanks is already obtained by the mechanism, the utilization of several motors has the advantage that new operating methods in terms of software can be developed and employed.

In the case of opposing shanks, it is a question of shanks having a connecting line that is perpendicular to the orientations of the scissor mechanisms. For instance, the inner shanks of the scissor mechanisms of the front row oppose one another.

The preferred embodiment, where one motor drives two opposing shanks in each instance, accordingly has the consequence that the rows are operated identically in each instance. The vibrations are consequently mirror-symmetrical to a plane that is a plane of symmetry of the nodal points and that is parallel to the planes of the scissor mechanisms. A horizontal motion parallel to this plane is a forward or rearward motion. Such forward and rearward motions are particularly useful in relation to utilization as a feed system, since they can cause parts to execute an efficient, targeted progressive motion. Therefore, by virtue of this preferred embodiment the complexity of the drive can be reduced in straightforward manner without important functions being lost.

In another embodiment, on the other hand, each shank is driven by one motor. In this way, the parts of the bulk material can be moved in all directions.

In one embodiment of a vibrating table, the tabletop comprises a conveying surface, a flap drive and a border. The border includes a discharge flap. The nodal points are attached to the border. The discharge flap can be brought into a closed position and an open position by the flap drive.

Since the nodal points are attached to the border, the conveying surface or the border can be exchanged without the nodal points having to be loosened. The conveying surface can consequently be adapted in its color, transparency, structure and material to the parts of the bulk material to be conveyed. In the case of bright parts, a dark conveying surface assists identification of the parts in the case of illumination from above. In the case of dark parts, on the other hand, a bright conveying surface increases the contrast in this situation. If there is illumination from below, a transparent conveying surface, distributing the light as evenly as possible, is helpful in many cases. By virtue of a structuring that is finer than certain dimensions of the parts, the parts can be prevented from resting completely on the conveying surface and remaining adhering there. In addition, a structuring can prevent an undesirable slipping of the parts. Depending upon the elasticity and friction between the parts and the conveying surface, which can be determined by the material and structure of the conveying surface, the transmission of an impulse to the parts can be regulated, and in this way a rebounding of the parts subsequent to a jump caused by the vibration of the table can, for instance, be largely suppressed.

An exchange of the border may be helpful, particularly when the type of the parts to be guided is changed, and significant changes in the trajectory result. In many cases, a rather deep border permits a robot arm to travel shorter distances and consequently to work faster. A high border, on the other hand, effectively prevents parts of the bulk material from jumping off the conveying surface.

The discharge flap can have two functions:

On the one hand, it can permit an automatic emptying of the conveying surface, by being opened while a vibrating motion is being executed that conveys the parts in the direction of the discharge flap.

On the other hand, in the closed state it can fix a conveying surface that is capable of being inserted.

In connection with this function there is preferably a second safety device which prevents the conveying surface from slipping out in the course of the discharge process. This second safety device may be, for instance, a lever which in the horizontal position keeps the conveying surface to the right and to the left against the delimiting sections of the border and which, for the purpose of exchanging the conveying surface, can be brought by hand into a vertical position in which the conveying surface has been released and can be pulled out.

The border preferably includes four posts—two thin and two thick—a U-shaped frame, which, if need be, may exhibit stabilizing struts, and a rectangular frame, on one side of which the discharge flap has been fitted, and also four side walls. The U-shaped frame preferably exhibits a groove into which the conveying surface can be inserted. The side walls are preferably held by the posts and the two frames. The two thick posts constitute the boundary posts for the discharge flap, and contain the flap drive and, where appropriate, guides for the discharge flap and also preferably the second safety device for the conveying surface. The nodal points are preferably attached to the U-shaped frame.

In one embodiment, the conveying surface is capable of being inserted into the border.

By virtue of the fact that it is capable of being inserted, an exchange of the conveying surface is particularly easy and quick. In addition, the conveying surface has been stably connected to the other parts of the tabletop in this way.

In another embodiment, the conveying surface is held on a floor of the vibrating table by screws, clips or rods locking into the side walls.

In one embodiment, the vibrating table includes a distance sensor which is arranged between the scissor mechanisms. The distance sensor registers the height of the tabletop.

The distance sensor is preferably an inductive analog sensor.

The distance sensor is preferably arranged in the middle between the nodal points—that is to say, at the point of intersection of the diagonals of the rectangle when the nodal points are arranged in the rectangle.

By virtue of the arrangement of the distance sensor between all the scissor mechanisms, all the shanks can be brought into their initial position with a single sensor, and in this way the device can be calibrated. This is because a point on the vibrating table between the distance sensors is precisely at its lowest in relation to the base when all the shanks are in their initial position. This is the initial position of the vibrating table.

A method for operating a vibrating table then also includes the setting of the initial position. For the method, the following steps are carried out:

A shank or a group of jointly driven shanks is moved until the height of the tabletop has the lowest value that is attainable by this movement. All the other shanks meanwhile remain in their current drive position. In the drive position in which the height of the tabletop assumes its lowest value, the moved shank or the moved group of jointly driven shanks is in its initial position.

Then this first step is repeated with the other shanks or groups of jointly driven shanks. Repetitions take place until all the shanks have attained their initial position. The initial position of the vibrating table has then been attained.

The height of the tabletop is registered with the distance sensor. Since the latter is located between the scissor mechanisms, the initial position of each shank can be ascertained independently of the drive position of the other shanks. Since, in addition, only the minimum is always sought, but not an absolute value, the calibration method is robust as regards a lowering or raising of the sensor or of the tabletop in the course of time.

In one method for operating a vibrating table, all the first shanks are driven synchronously, in order to move parts in a second direction. Meanwhile, the second shanks remain in their initial position.

The first shanks are all the shanks that, for the observer of the vibrating table from the side, constitute the left shanks of the scissor mechanisms in the given case or the right shanks of the scissor mechanisms in the given case.

Since all the scissor mechanisms are singly-driven, the tabletop undergoes a vertical motion of mean amplitude at all the nodal points. Since it is a question only of the first shanks, the horizontal motion is likewise the same at all the nodal points. If there is a linear guide, this horizontal component is primarily transmitted to the tabletop from the scissor mechanisms of the row without a linear guide.

The drive cycle begins with a movement upward and in the direction of the second shanks. By virtue of this phase of the drive cycle, the parts on the conveying platform are caused to hop in a second direction. The drive cycle then continues with a movement downward and in the direction of the first shanks. In this second phase, however, there is little or no contact of the parts with the conveying platform, since the parts are preferably still in the flight phase. Overall in this way, at a suitable drive frequency the parts are transported swiftly in the direction of the second shanks—that is to say, in the second direction.

In order to turn parts over on a first half of the vibrating table while the parts are jumping in the direction of the second half and while the parts on the second half of the vibrating table are largely stationary, all the shanks of the scissor mechanisms attached in the first half are driven synchronously. Meanwhile, the second shanks of the scissor mechanisms attached in the second half remain in their initial position.

The first half of the vibrating table may be the left or the right side of the vibrating table for the observer from the side. The second half is the half that is not the first half.

The selected scissor mechanisms are doubly-driven. The nodal points of these scissor mechanisms execute a motion with the maximum amplitude in the vertical direction, but no horizontal motion. The other scissor mechanisms remain in the initial position.

The tabletop accordingly tips up again and again into a slant, and back again into the horizontal. The first half of the vibrating table is repeatedly lifted by the maximum amplitude at the nodal points that are attached in the first half, whereas the nodal points of the second half retain their height and consequently also keep the tabletop low there. By virtue of the raising of the first half, given a suitable choice of the drive frequency the parts that are situated there are flung upward. On the one hand, by virtue of the tilting of the tabletop when moving up, and, on the other hand, because they fall back onto an inclined plane, they are given a force component that directs them in the direction toward the second half. The parts in the second half, on the other hand, are barely flung upward, since the amplitude of the vibration tends to be too small at their position. The parts on the second half of the tabletop are consequently substantially stationary with this method.

Another method for operating a vibrating table enables parts on the first half of the vibrating table to be turned over while the parts are jumping in the direction of the second half. Meanwhile, parts on the second half of the vibrating table move progressively further away from the first half of the vibrating table. In this case, the outer shanks of the scissor mechanisms attached in the first half and preferably the inner shanks of the scissor mechanisms attached in the first and in the second half are driven synchronously. The outer shanks of the scissor mechanisms attached in the second half meanwhile remain in their initial position.

If the first half is the rear half, then the nodal points of the scissor mechanisms attached there are firmly attached to the tabletop. If in the given case only the outer shank is driven by these scissor mechanisms, this results in a vertical motion, with the mean amplitude, and a horizontal motion, the direction of which is forward in the first drive phase. In the first drive phase, the direction of motion of the vertical motion is upward. The parts on the rear half are accordingly pushed upward and forward. In the region of the front half of the conveying plate, the amplitude is distinctly smaller in the vertical direction but substantially the same in the horizontal direction. The parts located there consequently likewise migrate forward with distinctly smaller hops.

In the preferred case—where, in addition to the rear, outer shanks, the inner shanks are also driven—the rear nodal point executes a vertical movement upward with the maximum amplitude in the first drive phase, but no horizontal movement. The driving of the inner shanks of the front scissor mechanism ensures that in the first drive phase a vertical movement with the mean amplitude happens there, and a horizontal movement forward. But this horizontal movement forward is largely taken up by the linear guide and barely passed on to the tabletop. But since all the parts now undergo a vertical acceleration, with which they hop into the air, and they are located on an oblique plane, a movement forward nevertheless still results. Since the rear nodal points attain the maximum amplitude at the same time as the front nodal points attain the mean amplitude, the transmissible impulse is distinctly greater in the rear half than in the front half. The drive frequency can therefore be chosen in such a manner that the parts in the rear half fly sufficiently high to turn over, whereas this is not the case in the front half.

If the first half is the front half, then the nodal points of the scissor mechanisms attached there have been attached to the tabletop via the linear guides. If only the outer shank is driven by these scissor mechanisms, this results in a vertical motion, with the mean amplitude, and a horizontal motion, the direction of which in the first drive phase is directed rearward. In the first drive phase, the direction of motion of the vertical movement is upward. However, the horizontal movement is barely transmitted to the tabletop, since the linear guide takes it up. The parts on the front half are accordingly pushed upward. In the region of the rear half of the conveying plate the amplitude in the vertical direction is distinctly smaller. Accordingly, the parts on the front half jump up substantially, albeit less high than in the case of a dual drive in the front half at the same frequency. A certain rearward movement—that is to say, from front to rear—results from the oblique plane, on average over time, onto which the parts impinge.

In the preferred case—where, in addition to the front, outer shanks, the inner shanks are also driven—the front nodal point executes a vertical movement upward with the maximum amplitude in the first drive phase, but no horizontal movement. The driving of the inner shanks of the rear scissor mechanism ensures that a vertical movement with the mean amplitude happens there in the first drive phase, and a horizontal movement rearward. This horizontal movement rearward is passed on to the tabletop, because the rear nodal points are firmly connected thereto. All the parts accordingly undergo both a vertical acceleration, with which they hop into the air, and a horizontal motion. In addition, they are located on an oblique plane. Consequently, an effective movement rearward results. Since the front nodal points attain the maximum amplitude at the same time as the rear nodal points attain the mean amplitude, the transmissible impulse in the vertical direction is distinctly greater in the front half than in the rear half, so the drive frequency can be chosen in such a manner that the parts in the front half fly sufficiently high in order to turn over, whereas this is not the case in the rear half. The horizontal component of the transmitted impulse additionally favors turning over.

In one method for operating a vibrating table, with which parts can be turned over and distributed evenly over the surface of the tabletop, all the shanks are driven synchronously.

In this embodiment, all the scissor mechanisms are doubly-driven. Accordingly, all the nodal points rise by the maximum amplitude at the same time. There is no horizontal component in the direction of motion. Therefore all the parts located on the tabletop jump up. At a suitable frequency of the drive, the height of flying permits the parts to turn over. A structured surface of the conveying plate can make it possible that, despite the purely vertical motion of the tabletop, an angular momentum that promotes turning over and distribution is transmitted to the parts.

A feed system according to the invention comprises a vibrating table according to the invention, a bunker and a return container. The return container is at least partially below the bunker. The vibrating table and the return container are arranged in such a manner that parts can slip and/or jump from the vibrating table into the return container.

This arrangement of bunker, vibrating table and return container is particularly compact, and it is sufficient that the user can get access from a single side, since from there he/she can both pour replenishing supplies into the bunker and remove sorted parts from the return container. The return container can also be utilized for the purpose of emptying the vibrating table and, where appropriate, the bunker, which may be important when exchanging the parts, for instance.

The vibrating table is preferably arranged in such a manner that the front half is situated near the return container. This embodiment permits a rapid transport of the parts in the direction of the return container, without said parts jumping too high. This is because it is sufficient to drive the outer shanks of the rear scissor mechanisms and to leave all the other shanks in the initial position. By virtue of the firm connection of the rear nodal points to the tabletop, in addition to an upward impulse an impulse for forward motion is transmitted in this way, and the parts migrate rapidly in the direction of the return container without jumping too far and too high.

In another embodiment, the vibrating table is arranged in such a manner that the rear half is situated near the return container and the parts can consequently be transported into the return container by a rearward movement. For this purpose an operating method presents itself in which, for instance, all the shanks of the front row and the inner shanks of the back row are driven, whereas the outer shanks of the back row remain in their initial position. In this way, both the mean inclination of the conveying plate and a transmission of linear momentum to the parts in the direction of the return container are obtained.

In one embodiment, the bunker includes a bunker drive and a feed flap. The feed flap prevents parts from falling out of the bunker onto the conveying table at an unintended time. The bunker drive preferably includes an eccentric disk.

The bunker serves as reservoir for the bulk material which is subsequently spread out on the vibrating table for removal by a robot arm, for instance.

In order to move the parts out of the bunker, the latter is equipped with a drive that is similar to but preferably simpler than that of the vibrating table. In this way, for the bunker drive an eccentric suffices, for instance, which generates a vibrating motion which during the movement upward also exhibits a motion component in the direction of the feed flap. For the purpose of stability, preferably several shanks driven by this eccentric have been attached to the bunker, for example at its corners. In this way, a tilting of the bunker is prevented, even if the bulk material were to have been distributed unfavorably in its interior.

In one embodiment, the bunker consists of a container receptacle, which is connected to the bunker drive, and a bulk-material container which can be connected to the container receptacle. The bulk-material container is open toward the feed flap. The feed flap has been formed on the container receptacle.

The feed flap can be opened and closed automatically by a motor, the flap drive of the feed flap. Said flap remains closed until further parts on the vibrating table are desired. If there is a desire for further parts, the feed flap opens while the bunker drive is running. Parts in the bunker are moved through the open feed flap by the vibrations caused by the bunker drive, and fall from there onto the vibrating table. As soon as the desired quantity of parts are located on the vibrating table, the feed flap is closed and the bunker drive is stopped.

In one embodiment, the bunker includes a rear light barrier and a central light barrier. The rear light barrier monitors a first region in front of the feed flap in the interior of the bunker. The central light barrier monitors the interior of the bunker in a second region, which has a fixed and known spacing from the first region.

If new parts are desired on the vibrating table, they should be delivered quickly, in order not to hold up unnecessarily the further processing steps for which the parts are needed. The rear light barrier makes it possible to establish whether parts are situated directly next to the feed flap. These parts will fall out of the bunker onto the vibrating table within a short time when the feed flap is opened and the bunker drive is actuated.

The feed system therefore preferably allows the bunker drive to run, with feed flap closed and even without a current request for more parts, until such time as the rear light barrier detects parts.

As soon as the bunker is empty, a user has to replenish parts. For the purpose of work planning, it is important for the user to know approximately how long it will be until a refilling becomes necessary. In the feed system according to the invention, the time for the removal of a part varies, depending upon the shape, size, material and weight of the part. The removal-time—that is to say, the time from the original location in the bunker up until the transporting away from the vibrating table—may also depend on further parameters or external circumstances. In order to give the user a practical and relevant estimate of the time up until refilling, the rear and central light barriers may be employed.

For this purpose a teach-in process is implemented. In this process, the time from which the central light barrier no longer detects any parts is established. From this point on, the removed parts are counted for such time until the rear light barrier also no longer detects any parts. The removal-time for a part in the case of an emptying bunker can be estimated by the duration between the two times, divided by the number of parts removed.

If the user desires an indication of a refilling soon becoming due in the case of a certain remaining running-time, the duration per part can be divided by the remaining running-time. This results in an estimate for the number of parts still located in the bunker, in the case of which the indication is to be given. Now if it is known during operation how many parts were charged into the bunker and how many of these parts have already been removed, the control unit can ascertain the remaining number of parts and inform the user at the desired time.

It is also possible to give the indication as a function of the last detected passage of a part through the central light barrier. For this purpose, the remaining running-time is subtracted from the duration ascertained in the teach-in process, and the indication is given after the differential duration after the last detected passage of a part through the central light barrier.

The method for teaching-in of a feed system that works together with a robot which removes bulk material from the conveying table accordingly comprises the following steps:

The period of time from the last detection of a part by the central light barrier up until the last detection of a part by the rear light barrier is determined.

The parts removed by the robot during this period are counted.

The duration of the period is divided by the number of parts. This result is stored.

The result is a mean removal-time per part in the case of a sparsely filled bunker.

The method for operating a feed system includes the step that, after the charging of bulk material, the bunker is driven by means of the bunker drive until such time as the rear light barrier detects parts.

In this way, the parts can be removed quickly when they are needed.

In one embodiment, the method for operating a feed system comprises the following steps:

Opening the bunker flap and driving the bunker with the aid of the bunker drive, so that parts fall out of the bunker onto the vibrating table.

Operating the vibrating table with the aid of its drive in such a way that the parts are distributed on the conveying surface.

Removing all appropriately situated parts on the conveying surface.

Subsequently operating the vibrating table in such a way that the position of the parts changes if there are still parts on it that are to be removed, and if parts that are not to be removed remain on the vibrating table, opening the discharge flap and operating the vibrating table in such a way that the parts fall into the return container.

For the distributing of the parts on the conveying surface, the parts are preferably firstly moved away from the bunker somewhat by synchronous driving of all the shanks pointing away from the bunker, and are subsequently induced to perform higher jumps by synchronous driving of all the shanks.

In order to change the position of the parts, all the shanks, or only those shanks having nodal points which are attached on the side of the tabletop remote from the bunker, are preferably driven synchronously once again.

In order that the parts fall into the return container, all the shanks pointing toward the return container are preferably driven synchronously.

Shanks pointing away from the bunker are shanks, in the case of which, in the initial position, the horizontal spacing between the point of attachment and the bunker is larger than the horizontal spacing from the midpoint of the shank to the bunker. Analogously, shanks point toward the return container if, in the initial position, the horizontal spacing between the point of attachment and the return container is smaller than the horizontal spacing between the midpoint of the shank and the return container.

Further advantageous embodiments and combinations of features of the invention result from the following detailed description and the totality of the claims.

BRIEF DESCRIPTION OF THE DRAWINGS

The drawings that are used for elucidating the exemplary embodiment show.

As a matter of principle, identical parts in the figures have been provided with identical reference symbols.

Ways for Implementing the Invention

Figure 1A:
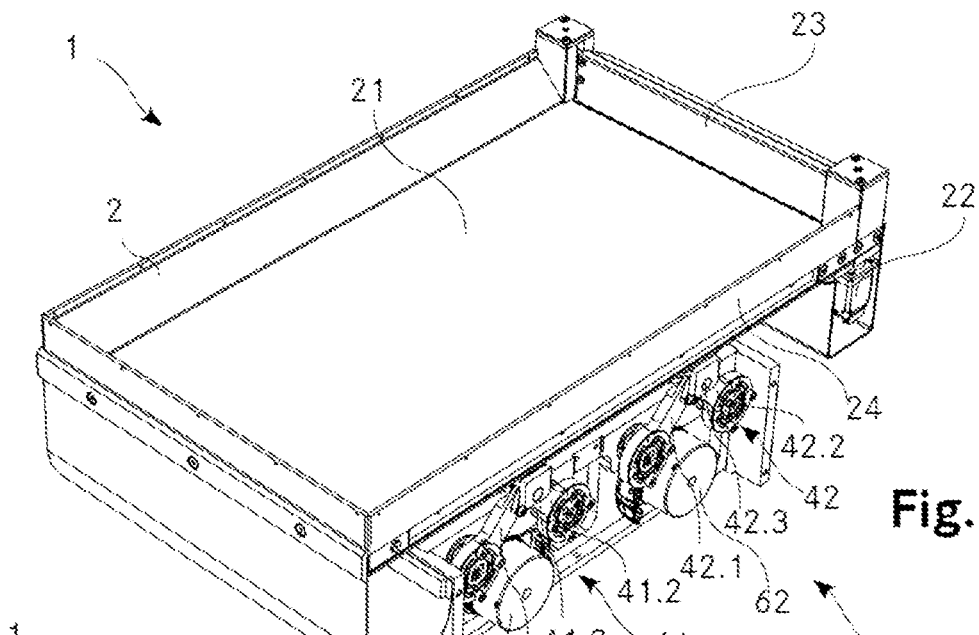
FIG. 1a a vibrating table in a view from obliquely above

FIG. 1a shows a vibrating table 1 in a view from obliquely above. Clearly visible is the tabletop 2 which exhibits a flat and rectangular conveying surface 21 which is surrounded by a border 24. The border 24 has a certain height which, however, is significantly smaller than the length or the width of the conveying surface 21 and consequently also than the length and width of the border 24. One of the short sides of the border 24 takes the form of a discharge flap 23. The latter can be swiveled into an open position in which the relevant short side of the conveying surface 21 is exposed and is not separated from the environment by a border 24 or other boundary. If, on the other hand, the discharge flap 23 is in the closed position, it delimits the conveying surface 21 just like the remaining sides of the border 24, and in this way prevents parts from jumping off the conveying surface 21.

The discharge flap 23 is brought into the open or closed position by a flap drive 22. In the example shown, the flap drive 22 is accommodated in the two posts that flank the relevant narrow side of the border 24 and consequently also the discharge flap 23.

The vibrating table 1 includes, in addition, a drive 3. Drive 3 is located below the tabletop 2. In the view shown, only half of drive 3 is discernible. Drive 3 comprises a total of four scissor mechanisms 41, 42, 43 and 44 and four motors 61, 62, 63, 64. In the view shown, however, only two scissor mechanisms 41, 42 and two motors 61, 62 are discernible. The scissor mechanisms comprise, respectively, a first shank 41.1, 42.1, a second shank 41.2, 42.2 and a nodal point 41.3, 42.3. The first and second shanks 41.1, 41.2, 42.1, 42.2 come together at the respective nodal point 41.3, 42.3. On the side facing away from the nodal point 41.3, 42.3, the shanks 41.1, 41.2, 42.1, 42.2 are attached to eccentric disks 41.11, 41.21, 41.21, 42.21. The axes of rotation 9 of the eccentric disks 41.11, 41.21, 41.21, 42.21 are situated in a plane that, when the scissor mechanisms are all in their initial position, is parallel to the conveying surface 21.

The shanks 41.1, 41.2, 42.1, 42.2 of the scissor mechanisms 41, 42 each span a triangle. Both triangles are situated in the same plane. This plane is parallel to the planes in which the long sides of the border 24 are situated. The nodal points 41.3, 42.3 are attached to the border 24.

Figure 1B:
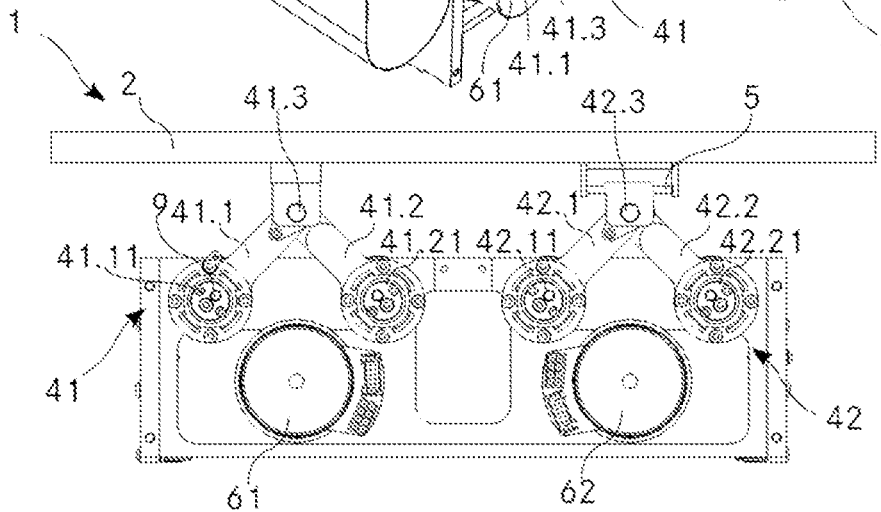
FIG. 1b a vibrating table in a side view

FIG. 1b shows a vibrating table 1 from the side. The tabletop 2 is only indicated, and no particulars are discernible. On the other hand, drive 3, with its scissor mechanisms 41 and 42 visible here and with the motors 61 and 62, is shown. The eccentric disks 41.11, 41.21, 42.11 and 42.21 can be readily discerned in the view from the side. In the middle of the eccentric disks 41.11, 41.21, 42.11 and 42.21 two circles abutting one another can be discerned. A concentric, smaller, second circle has been drawn in one of them. This double circle marks, in each instance, the midpoint of the eccentric disks 41.11, 41.21, 42.11 and 42.21. The midpoint of each shank is situated at the same point as the midpoint of the respective eccentric disk. The blank circle, on the other hand, marks the axis of rotation 9. The midpoint is offset with respect to the axis of rotation 9 by the eccentricity e.

FIG. 1b shows all the shanks 41.1, 41.2, 41.2, 42.2 and eccentric disks 41.11, 41.21, 42.11, 42.21 in their initial position. The shank segment corresponds to the line-segment from the midpoint of the eccentric disks 41.11, 41.21, 42.11, 42.21 to the respective nodal point 41.3, 42.3, since the point of attachment of the shank in question is situated in each instance at the corresponding nodal point, and the midpoint of the eccentric disk in question is situated at the midpoint of the respective shank. In the initial position, the axis of rotation 9 is situated on the line-segment and consequently between the midpoint of the eccentric disks 41.11, 41.21, 42.11, 42.21 and the corresponding nodal point 41.3, 42.3.

Discernible in FIG. 1b, in addition, is the attachment of the nodal points 41.3 and 42.3 to the tabletop 2. The nodal point 41.3 or 42.3 constitutes an axis about which both shanks 41.1, 41.2 or 42.1, 42.2 of the scissor mechanism 41 or 42 in question are able to rotate, at least within a certain angular range. In this example, this axis is accommodated by a sleeve with a flat upper side, which is substantially open on three sides parallel to the axis and consequently does not restrict the rotation of the shanks 41.1, 41.2 or 42.1, 42.2 in regular use. In FIG. 1b, scissor mechanism 41 is situated in the back row, and scissor mechanism 42 is situated in the front row.

The scissor mechanism 41 of the front row is firmly connected to the tabletop 2 by its nodal point 41.3, for instance by the flat upper side of the sleeve having been glued or screwed onto the tabletop 2. An adapter piece or a spacer can also establish a firm connection between the tabletop 2 and nodal point 41.3.

The scissor mechanism 42 of the back row is attached to the tabletop 2 by its nodal point 42.3 by means of a linear guide 5. The linear guide 5 is realized here by a T-beam which is held parallel to the tabletop at a certain spacing. The T-beam is situated in the plane that is defined by scissor mechanism 42. With the broad side of the T-shape, designated in the following as the "roof", the beam points away from the tabletop 2. The sleeve, which serves for attaching nodal point 42.3, includes a guide on its flat surface. This guide can be realized by two parallel grooves, the largest spacing of which is a little larger than the width of the roof, and the smallest spacing of which is smaller than the width of the roof but larger than the width of the "stem" of the T-shape. The guide accommodates the roof of the T of the linear guide 5. The linear guide 5 is, in turn, firmly connected to the tabletop 2.

The connections of the nodal points 41.3 and 42.3 are dimensioned in such a manner that in the initial position of all the scissor mechanisms 41, 42, 43, 44 the tabletop 2 is parallel to the plane that is defined by the axes of rotation 9 of all the eccentric disks 41.11, 41.21, 42.11, 42.21.

Figure 1C:
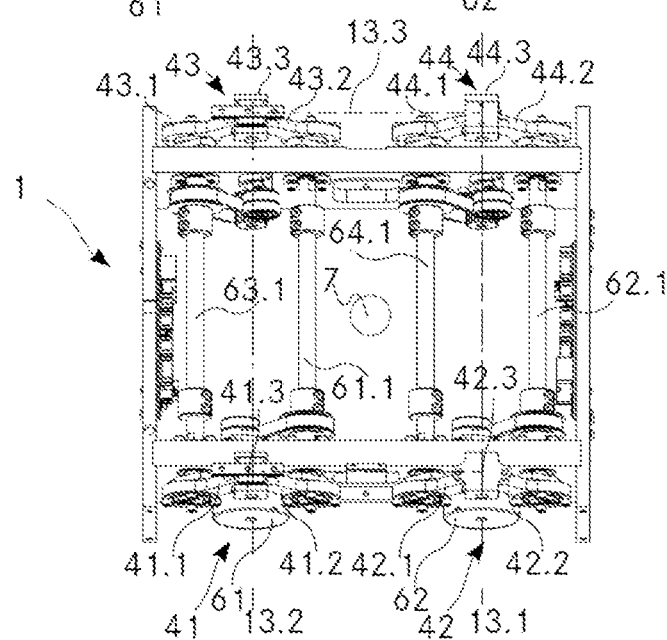
FIG. 1c the vibrating table shown in FIG. 1b, in the view from above, without tabletop FIG. 2 a schematic drawing of a feed system FIG. 3 a schematic drawing of a shank of a scissor mechanism FIG. 4a a sketch of the mode of operation of the scissor mechanism in the case of dual driving.

FIG. 1c shows drive 3 of the vibrating table 1 from obliquely above. The tabletop 2 is not shown. All four scissor mechanisms 41, 42, 43, 44 are discernible; each has a nodal point 41.3, 42.3, 43.3, 44.3. In the view from above, all the first shanks 41.1, 42.1, 43.1 and 44.1 are located on the left side of the nodal point of the scissor mechanism 41, 42, 43 or 44 in question. In the view from above, all the second shanks 41.2, 42.2, 43.2, 44.2 are located on the right side of the nodal point of the scissor mechanism 41, 42, 43 or 44 in question.

The nodal points 41.3, 42.3, 43.3, 44.3 are situated in two parallel rows 13.2 and 13.1 in the initial position. In the present case, the nodal points 41.3, 42.3, 43.3, 44.3 span a rectangle 13.3 in their initial position. The second shanks of the back row, 43.2 and 41.2, and the first shanks of the front row, 42.1 and 44.1, are situated within the rectangle 13.3 and are therefore inner shanks. The first shanks of the back row, 43.1 and 41.1, and the second shanks of the front row, 42.2 and 44.2, are situated outside the rectangle 13.3 and are therefore outer shanks.

Motor 61 is arranged below scissor mechanism 41. The rotation generated by motor 61 is transmitted to drive axle 61.1 by means of a belt. Drive axle 61.1 is perpendicular to the planes of the scissor mechanisms. When the drive shaft 61.1 rotates, it sets eccentric disks 41.21 and 43.21 in rotation about their axis of rotation 9. Consequently the second shanks 43.2 and 41.2 of the two rear scissor mechanisms 41 and 43 are set in motion by the same motor 61.

Analogously, a motor 63, not shown, which is arranged below scissor mechanism 43, drives a drive axle 63.1 and, above it, the two first shanks 41.1 and 43.1 of the two rear scissor mechanisms 41 and 43.

The drive of the two first shanks 42.1 and 44.1 of the front scissor mechanisms 44 and 42 is realized analogously by motor 64 and drive axle 64.1. The drive of the two second shanks 42.2 and 44.2 of the front scissor mechanisms 44 and 42 is realized analogously by motor 62 and drive axle 62.1.

The nodal points 41.3 and 43.3 of the back row 13.2 are firmly connected to the tabletop 2. For this purpose, the sleeves in which the nodal points 41.3 and 43.3 are situated have been provided with a bar with screw holes. By virtue of the screw holes, the bar can be attached to the tabletop 2, by screws being screwed into the tabletop 2 through the screw holes. The sleeve and hence also the nodal point 41.3, 43.3 have then been firmly attached to the tabletop 2.

The nodal points 44.3 and 42.3 of the front row 13.1 are connected to the tabletop 2 via a linear guide 5. At nodal point 44.3 the sleeve can be seen with the guide in the form of two parallel grooves. At nodal point 42.3 the part of the linear guide 5 that is actually likewise attached to the tabletop with screws is discernible, said part exhibiting a T-beam, the roof of which can just be accommodated by the grooves of the sleeve.

The motors 61, 62, 63, 64 and the drive axles 61.1, 62.1, 63.1, 64.1 and the axes of rotation 9 of the eccentric disks 41.11, 41.21, 42.11, 42.21, 43.11, 43.21, 44.11, 44.21 are attached to a common trestle which constitutes a base with respect to which the tabletop 2 can be moved.

Between all the scissor mechanisms 41, 42, 43, 44, approximately in the middle of the rectangle 13.3, in addition a distance sensor 7 is arranged which can measure the spacing or the change in the spacing from the tabletop 2. The distance sensor 7 is likewise attached to the common trestle.

Figure 2:
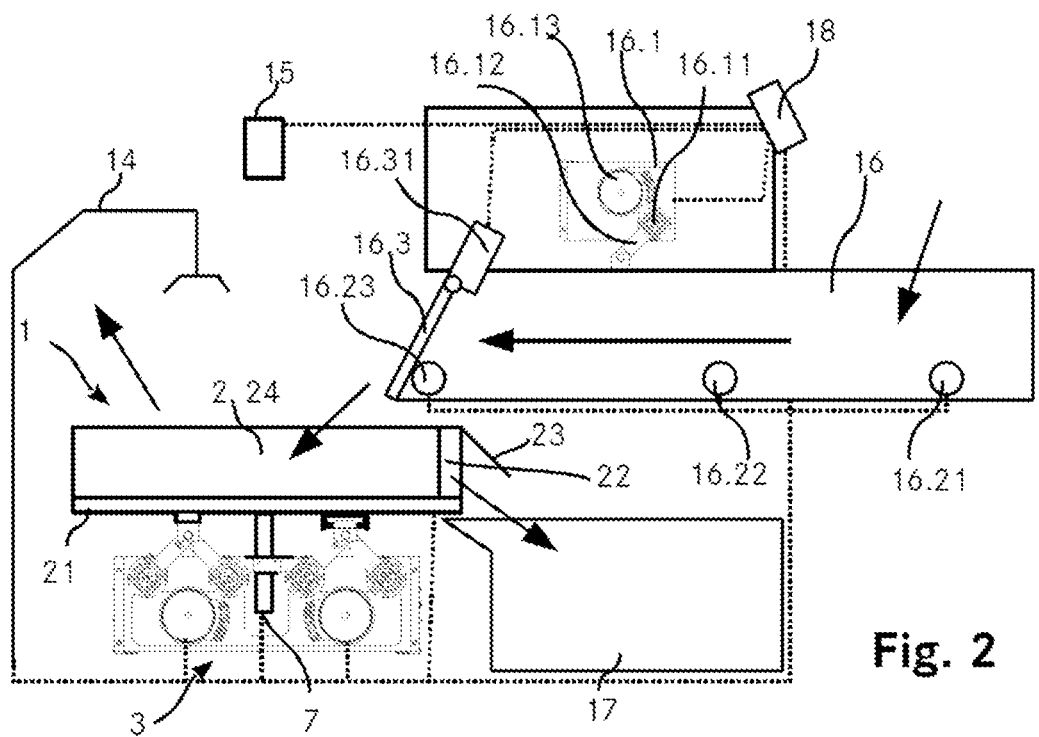

FIG. 2 shows a schematic drawing of a feed system according to the invention. The feed system comprises a vibrating table 1 according to the invention, a bunker 16 and a return container 17.

The path of the parts of the bulk material through the feed system is marked by arrows. The bulk material is charged into the bunker 16 and transported from there in small portions onto the vibrating table 2. As a result of operation of the vibrating table 2, the parts are spread out. Their position is then captured with the camera 15. With the aid of the information from the camera 15, the correctly situated parts are grasped by the robot 14 and supplied to their destination. By renewed movement of the vibrating table 2, the position of the parts is changed, the situation is recaptured with the camera 15, and all suitable parts are transported away by the robot 14. If no further parts are to be grasped by the robot 14—for instance, because they appear to be defective or because a different type of part is desired—the discharge flap 23 is opened by the flap drive 22, and the vibrating table 1 is operated in such a manner that the parts migrate through the open discharge flap 23 and fall from there into the return container 17.

At the start of operation, the vibrating table 2 is brought into the initial position. For this purpose, the height of the tabletop 2 is monitored with the aid of the distance sensor 7. Each jointly driven pair of eccentric disks is moved, one after the other, until such time as the height of the tabletop 2 is at the lowest point of the drive cycle.

After the bulk material has been charged into the bunker 16, the bunker 16 is moved by the bunker drive 16.1 until such time as parts are detected at the rearmost light barrier 16.23. The feed flap 16.3 there prevents the parts from falling onto the vibrating table 2 at an undesirable time. The feed flap 16.3 can be opened and closed by a flap drive 16.31. The fact that bulk material has actually been refilled into the bunker 16 is registered by the front light barrier 21.1.

With the aid of the front, central and rear light barriers 16.21, 16.22 and 16.23, the removal-time per part can be estimated when the bunker 16 is almost empty, and hence a time up until the need for refilling can be ascertained.

For this purpose, the time is ascertained at which the last part passes through the central light barrier 16.22. From this time, the parts removed by the robot 14 are registered. The counting is stopped at the moment when the last part has passed through the rear light barrier 16.23. Let the number of counted parts be N. For the removal of N parts, the time-difference between the last detection in the central light barrier 16.22 and the last detection in the rear light barrier 16.23 is accordingly required. In addition, in this way it is known that in the case of an almost empty bunker there are N parts between the two light barriers. Since the removal-time per part is $\Delta t/N$, a user who is to be warned a remaining running-time T prior to refilling should accordingly be warned precisely when $NT/\Delta t$ parts are still in the bunker. This is approximately the case when $N-NT/\Delta t$ parts have already been removed since the last detection of a part by the central light barrier 16.22, and this is the case, on average, after a time $\Delta t-T$. For the purpose of improving the estimation further, the measurements can be repeated and combined and also adapted by user inputs.

The control unit 18 receives the data pertaining to all the light barriers 16.21, 16.22, 16.23, to the robot arm 14, to the drives 3, 22, 16.31, 16.1, and to the camera 15. The data lines are indicated by dashed lines. The data for ascertaining the time up until the need for refilling are also stored in the control unit 18 and are utilized in order to notify the user at the desired time. The control unit 18 determines, in addition, the type and duration of the operation of the vibrating table 1 as a function of the signals from the camera 15, and the type and duration of the operation of the bunker drive 16.1 as a function of the signals from the light barriers 16.23, 16.22 and 16.21. The control unit 18 can, in addition, take inputs of the user into account.

The bunker drive 16.1 comprises an eccentric disk 16.11, a shank 16.12 and a motor 16.13. The motor 16.13 drives the eccentric disk 16.11 in such a manner that in a first drive phase the bunker 16 moves upward and in the direction of the feed flap 16.3, and in the second drive phase moves back into the starting position. Since the transmission of linear momentum to the parts is greater in the first drive phase than in the second drive phase, the parts in the bunker migrate toward the feed flap 16.3 and, when this has been opened, through it.

Figure 3:
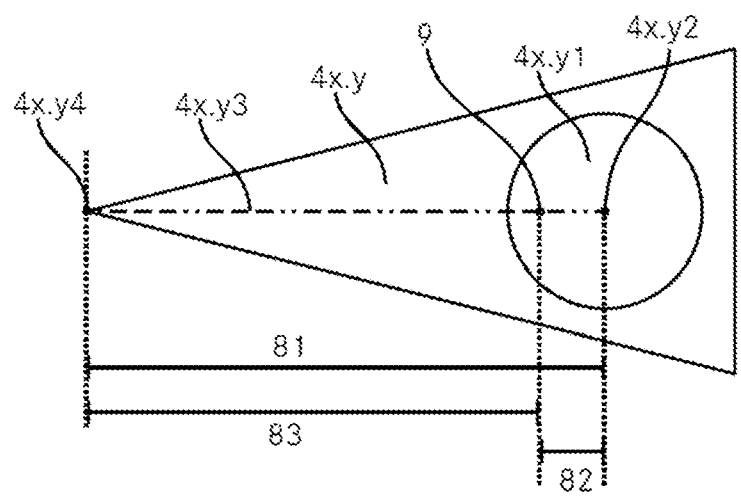

FIG. 3 shows a sketch of a shank 4x.y of a scissor mechanism. The shank 4x.y has been sketched as a triangle. One of its corners is the point of attachment 4x.y 4. Just above the base with respect to this corner, the shank 4x.y exhibits a circular hole into which an eccentric disk 4x.y 1 has been embedded. The midpoint of the eccentric disk and the midpoint 4x.y 2 of the shank are situated at the same place. The axis of rotation 9 has likewise been drawn in. The spacing between the midpoint of the eccentric disk and the axis of rotation 9 is the eccentricity 82. The spacing between the point of attachment 4x.y 4 and the midpoint 4x.ys of the shank is the length 81 of the shank 4x.y. The line-segment between these two points, drawn in here by a dash-dotted line, is the shank segment 4x.y 3.

In the case shown, the axis of rotation 9 is situated on the shank segment 4x.y 3. Therefore the shank 4x.y, as shown by FIG. 3, is in the initial position.

The minimum effective length, a, 83 is equal to the shank length 81 minus the eccentricity 82.

The spacing between the axis of rotation 9 and the point of attachment 4x.y 4 is the effective length, and it increases to the shank length 81 plus the eccentricity 82 when the eccentric disk has rotated about 180°. The effective length of the shank 4x.y—that is to say, the length beyond the axis of rotation 9—changes as a result of the rotation of the eccentric disk 4x.y 1.

Figure 4A:
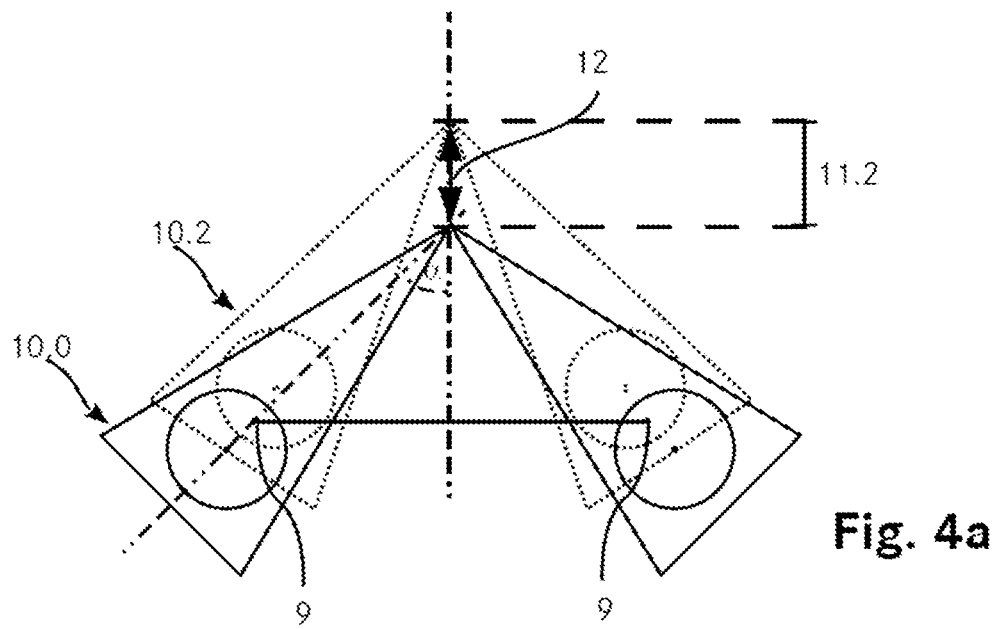
FIG. 4b a sketch of the mode of operation of the scissor mechanism in the case of single driving.

FIG. 4a shows a scissor mechanism with two shanks of the type from FIG. 3, the eccentric disks of which rotate synchronously. It is a question of a dual drive. At the nodal point the two shanks are connected at their points of attachment. The axes of rotation 9 are both stationary and consequently have the same spacing from one another during the entire drive cycle.

The position of the two shanks in the initial position 10.0 has been drawn in solid lines. The situation can be described by a triangle, the corners of which constitute the axes of rotation 9 and the nodal point. Since both shanks are in the initial position and both shanks are equally dimensioned, the triangle is isosceles. In the initial position, the sides of the triangle have lengths a, a and G. The base of this triangle is the line-segment between the two axes of rotation, and has length G. As described in connection with FIG. 3, a is the minimum effective length. The height of the triangle corresponds to the smallest spacing that the nodal point can have from the base.

If the eccentric disks are now rotated synchronously, the effective length of the shanks increases until they have the maximum effective length a+2e, where e is the eccentricity. This situation has been sketched with dashed lines. The nodal point now has its greatest height. It is accordingly a question of the position with the maximum amplitude 10.2. The triangle having corners which constitute the axes of rotation 9 and the nodal point is still isosceles, but its aperture angle has decreased in comparison with the triangle in the initial position. The side-lengths are a+2e, a+2e and G.

Regardless of where the eccentric disks are presently located in the drive cycle, the effective length of the two shanks is always the same. The triangles arising are accordingly always isosceles. The nodal point therefore always lies on the axis of symmetry, which is common to all the triangles arising in this situation.

In the course of dual driving, the nodal point consequently moves up and down between the extreme values shown. The maximum amplitude 11.2 of this oscillation is the spacing between the height of the nodal point in the position with the maximum amplitude 10.2 and the height of the nodal point in the initial position. The movement of the nodal point 12 is purely vertical and has been drawn in FIG. 4a with a double-headed arrow.

Figure 4B:
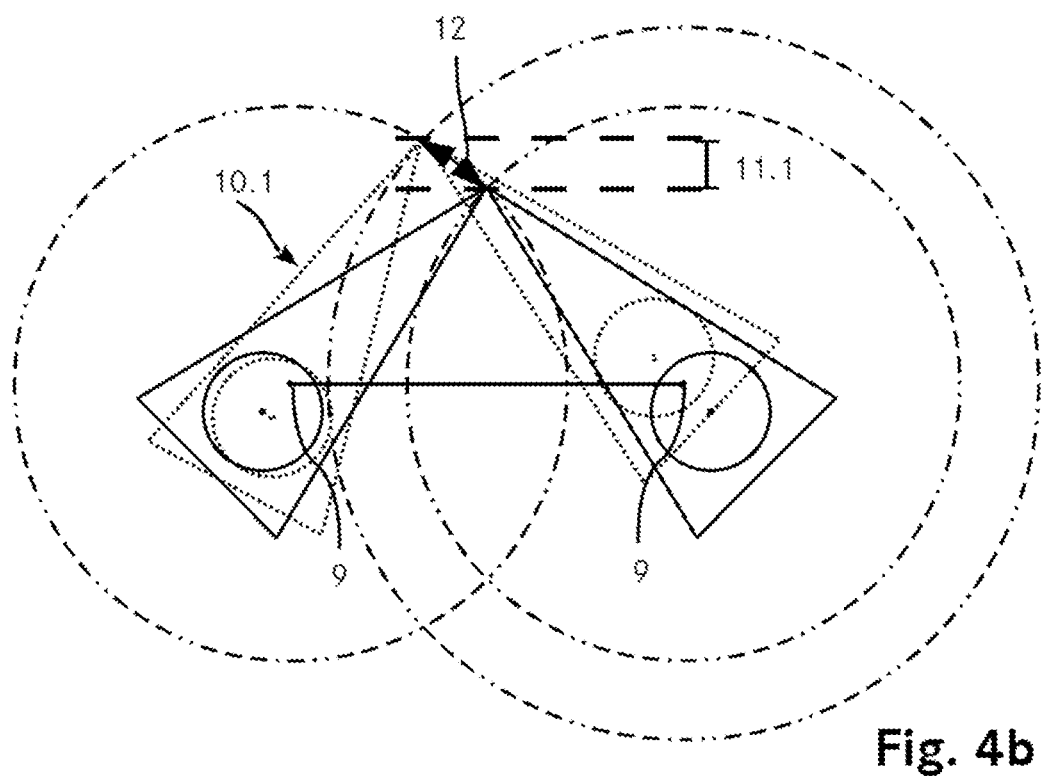

FIG. 4b shows a similar situation. The same shanks in the same initial position as in FIG. 4a are shown in solid lines. In the initial position, also in this case the nodal point lies on the line of symmetry of the triangle and at the same height as in FIG. 4a.

Shown by dashed lines in FIG. 4b is the situation in which the right shank has a maximum effective length in the case of single drive. After a 180° rotation of the eccentric disk with respect to the initial position—that is to say, after half a drive cycle—the triangle arising between the axes of rotation and the nodal point has side-lengths a, a+2e and G and hence is no longer isosceles; its height is less than in the case of FIG. 4a.

In the case of single drive, the nodal point moves up and down in the vertical direction between the height of the initial position and the mean height shown in FIG. 4b. The amplitude of this oscillation is the mean amplitude 11.1.

The movement of the nodal point 12 is restricted by the non-driven—here, left—shank. The point of attachment of the left shank can only move around the left axis of rotation on a circle with radius equal to the effective length of the left shank. The effective length of the left shank remains the same during the entire drive cycle. This circle has been drawn in FIG. 4b.

The right shank changes its effective length during the drive cycle. The point of attachment of the right shank must always lie on a circle around the right axis of rotation, the radius of which corresponds to the effective length of the right shank at the corresponding point in the drive cycle. Depending upon the point in the drive cycle, this circle accordingly has a varying radius. In FIG. 4b, both the smallest and the largest of these circles are. In the case of the largest circle, the radius is equal to the maximum effective length and consequently to the shank length plus the eccentricity. In the case of the smallest circle, the radius is equal to the smallest effective length and consequently to the shank length minus the eccentricity.

Since it is common to both shanks, the nodal point must always lie at the point of intersection of the circle of the left shank and the circle of the right shank. Accordingly, the nodal point follows the circle around the non-driven shank. The movement of the nodal point 12 is therefore both vertical and horizontal and has been drawn with a double-headed arrow in FIG. 4b. However, the oscillation does not follow the whole circle but follows only a segment of the circle. The segment of the circle is delimited by the points of intersection with the smallest circle and with the largest circle of the right shank.

Summing up, it is to be noted that a vibrating table may also exhibit more than four scissor mechanisms—for instance, six or eight. Also, the arrangement of the nodal points may be trapezoidal instead of rectangular. It is possible to drive each eccentric disk individually and independently of all the others, instead of combining them in pairs. The shanks may also be driven in a different way; for instance, a linear motor may replace the eccentric disks and the motors. Instead of coming together at a nodal point, the shanks may also be held at a fixed distance from one another by a connecting web at their points of attachment. The linear guide may be employed at the front or at the rear. In addition, a virtual linear guide is conceivable, in which the scissor mechanisms that are not actually driven are nevertheless driven to such an extent or left free that a phase shift results in the drive phase of the shanks of a scissor mechanism, which permits precisely the horizontal motion needed.

The feed system may have a different bunker drive. For instance, a conveyor belt can transport the parts in the bunker, or a comb can push them in the desired direction. In addition, the bunker drive may also include scissor mechanisms such as are known from the vibrating table. In one embodiment, the bunker is realized by a second vibrating table.

The invention claimed is:

1. A vibrating table comprising a tabletop and a drive, wherein the drive comprises four scissor mechanisms, each with a first and a second shank and with a nodal point, wherein the nodal points are attached to the tabletop, and the first can be moved independently of the second shank.

2. The vibrating table as claimed in claim 1, wherein each shank is rotatably attached to an eccentric disk and can be moved by rotation of the eccentric disk.

3. The vibrating table as claimed in claim 1, wherein the nodal points are arranged in a front row and in a back row and the front and back rows are parallel to one another, and wherein the scissor mechanisms are oriented so as to be perpendicular to the rows, and wherein two of the nodal points that are situated in the front row are attached to a linear guide on the tabletop, and two of the nodal points that are situated in the back row are firmly attached to the tabletop.

4. The vibrating table as claimed in claim 1, wherein four electronically synchronized motors drive the shanks.

5. The vibrating table as claimed in claim 4, wherein the four electronically synchronized motors drive the shanks by each motor setting the eccentric disks of, in each instance, two of the shanks which are opposing each other, whereas the two shanks which are opposing each other have a connecting line that is perpendicular to the orientations of the scissor mechanisms, in rotation.

6. The vibrating table as claimed in claim 1, wherein the tabletop comprises a conveying surface, a flap drive and a border, and wherein the border includes a discharge flap, wherein the nodal points are attached to the border, and the discharge flap can be brought into a closed position and an open position by the flap drive.

7. The vibrating table as claimed in claim 6, wherein the conveying surface is capable of being inserted into the border.

8. The vibrating table as claimed in claim 1, including a distance sensor which is arranged between the scissor mechanisms and registers the height of the tabletop.

9. A method for operating a vibrating table as claimed in claim 8, wherein for the purpose of setting an initial position the following steps are carried out:
    moving at least one of the first and/or at least one of the second shank of the at least one scissor mechanism until the height of the tabletop has the lowest value that can be attained by this movement and consequently the at least one of the first and/or at least one of the second shank of the at least one scissor mechanism are in their initial position, whereas all the other shanks retain their current drive position,
    repeating the first step with the other shanks until all the shanks have attained their initial position.

10. A method for operating a vibrating table as claimed in claim 1, synchronously driving all the first shanks, thereby moving parts in a second direction.

11. A method for operating a vibrating table as claimed in claim 1, synchronously driving all the shanks of the scissor mechanisms attached in a first half, thereby turning parts over on a first half of a vibrating table while the parts are jumping in the direction of a second half and while the parts on the second half of the vibrating table are largely stationary.

12. A method for operating a vibrating table as claimed in claim 1, synchronously driving all the shanks, thereby turning parts over and distributing them evenly over the surface of the tabletop.

13. A feed system comprising a vibrating table as claimed in claim 1 and a bunker and a return container, wherein the return container is at least partially below the bunker, and the vibrating table and the return container are arranged in such a manner that parts can jump from the vibrating table into the return container.

14. The feed system as claimed in claim 13, wherein the bunker includes a rear light barrier and a central light barrier, wherein the rear light barrier monitors a first region in front of a feed flap in the interior of the bunker, and the central light barrier monitors the interior of the bunker in a second region which has a fixed and known spacing from the first region.

15. A method for teaching-in of a feed system as claimed in claim 14, wherein the feed system is working together with a robot which removes bulk material from the conveying table, the method comprising the steps of
    determining the period of time from the last detection of a part by the central light barrier up until the last detection of a part by the rear light barrier and
    counting the parts removed by the robot during this period, and
    dividing the duration of the period by the number of parts, and storing this value.

16. A method for operating a feed system as claimed in claim 13,
    after the charging of bulk material driving a bunker by means of a bunker drive until such time as a rear light barrier detects parts.

17. The method as claimed in claim 16, comprising the following steps:
    opening a bunker flap and driving the bunker with the aid of the bunker drive, so that parts fall out of the bunker onto the vibrating table and
    operating the vibrating table with the aid of its drive, so that the parts are distributed on the conveying surface, and
    removal of all appropriately situated parts on the conveying surface and
    subsequently, renewed operating of the vibrating table, if parts that are to be removed are still located thereon and
    if parts that are not to be removed remain on the vibrating table, opening a discharge flap and operating the vibrating table so that the parts fall into the return container.

18. The method as claimed in claim 17, wherein operating the vibrating table with the aid of its drive, so that the parts are distributed on the conveying surface, is performed using the steps
    synchronously driving all the first shanks, thereby moving parts in a second direction and
    synchronously driving all the shanks, thereby turning parts over and distributing them evenly over the surface of the tabletop.

19. The method as claimed in claim 17, wherein subsequently, renewed operating of the vibrating table, is performed by synchronously driving all the shanks of the scissor mechanisms attached in a first half, thereby turning parts over on the first half of the vibrating table while the parts are jumping in the direction of a second half and while the parts on the second half of the vibrating table are largely stationary.

20. The method as claimed in claim 17, wherein opening the discharge flap and operating the vibrating table so that the parts fall into the return container by synchronously driving all the first shanks, thereby moving parts in a second direction.

* * * * *